United States Patent
Lucas

(10) Patent No.: US 9,422,006 B2
(45) Date of Patent: Aug. 23, 2016

(54) FRAME STRUCTURE FOR URGING WHEELS TO A DESIRED POSITION DURING CRASHES

(71) Applicant: Honda Motor Co., Ltd., Minato-ku, Tokyo (JP)

(72) Inventor: Jeremy P. Lucas, Delaware, OH (US)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 14/567,679

(22) Filed: Dec. 11, 2014

(65) Prior Publication Data

US 2016/0167711 A1  Jun. 16, 2016

(51) Int. Cl.
  *B62D 21/15* (2006.01)

(52) U.S. Cl.
  CPC .............. *B62D 21/152* (2013.01); *B62D 21/15* (2013.01); *B62D 21/155* (2013.01)

(58) Field of Classification Search
  CPC .... B62D 21/152; B62D 21/155; B62D 21/15; B62D 21/12
  See application file for complete search history.

(56) References Cited

U.S. PATENT DOCUMENTS

| 5,482,322 | A | 1/1996 | Wheatley et al. | |
| 6,631,943 | B2 * | 10/2003 | Muller | B60J 7/0015 296/211 |
| 6,957,846 | B2 * | 10/2005 | Saeki | B62D 21/152 180/232 |
| 8,562,021 | B1 | 10/2013 | Kuwabara et al. | |
| 2004/0046381 | A1 * | 3/2004 | Yoshida | B60G 99/00 280/784 |
| 2005/0077756 | A1 * | 4/2005 | Matsuda | B62D 21/152 296/203.02 |
| 2006/0181071 | A1 * | 8/2006 | Mitsui | B62D 21/155 280/784 |
| 2011/0198889 | A1 * | 8/2011 | Takeshita | B62D 21/155 296/203.02 |
| 2013/0200653 | A1 * | 8/2013 | Yasui | B62D 21/11 296/187.08 |
| 2013/0270029 | A1 * | 10/2013 | Young | B62D 21/155 180/274 |
| 2014/0062129 | A1 | 3/2014 | Syed et al. | |
| 2015/0298741 | A1 * | 10/2015 | Winberg | B62D 21/155 296/187.09 |

FOREIGN PATENT DOCUMENTS

| JP | 5-85414 | 4/1993 |
| JP | 8-310444 | 11/1996 |
| JP | 2002-127936 | 5/2002 |

* cited by examiner

*Primary Examiner* — Darlene Condra
(74) *Attorney, Agent, or Firm* — Arent Fox LLP

(57) ABSTRACT

A bend initiating structure or contact member is provided on or as part of frame. A tie rod associated with a wheel is engaged and bending initiated during a front or offset vehicle crash event where the subframe has detached from the frame. This engagement turns the wheel, so that there is more stroke space with which to absorb energy in a crash event. Detachment of the subframe from the frame during the crash event reduces the energy absorption capacity of the vehicle system because the subframe is no longer carrying load, however, the energy absorption stroke of the frame is increased by turning the wheel to a toe out position.

20 Claims, 4 Drawing Sheets

FRAME STRUCTURE FOR URGING WHEELS TO A DESIRED POSITION DURING CRASHES

BACKGROUND

The present disclosure relates to vehicle structures, and more particularly to an arrangement that moves wheels to a desired position during a crash event.

SUMMARY

A vehicle body structure is modified to incorporate a tie rod bending structure that turns a wheel during a crash event.

The vehicle body structure includes a frame/body, and a subframe that selectively detaches from the frame in a crash event. A tie rod extends from the subframe. A contacting member on the frame is mounted for contact with the tie rod when the subframe detaches from the frame. The contacting member is mounted to advantageously turn wheels outwardly, i.e. to a toe-out position, upon engagement with the tie rod.

The contacting member is dimensioned such that the tie rod is engaged thereby only when the subframe detaches from the frame.

The contacting member is located on the frame at a position that shortens an effective length of the tie rod.

A primary benefit is the ability to create increased space with which to absorb energy during a crash event for example, re-orienting the wheel (generally deemed incompressible) so that the incompressible dimension of the wheel is reduced.

Still another benefit relates to the simple modification to the existing structure (e.g., frame) to incorporate this feature.

Yet another advantage resides in the ability to alter the wheel position (that is carried by the subframe) when the subframe separates from the body.

Still other benefits and advantages of the present disclosure will become more apparent from reading and understanding the following detailed description.

DETAILED DESCRIPTION

Figure 1:
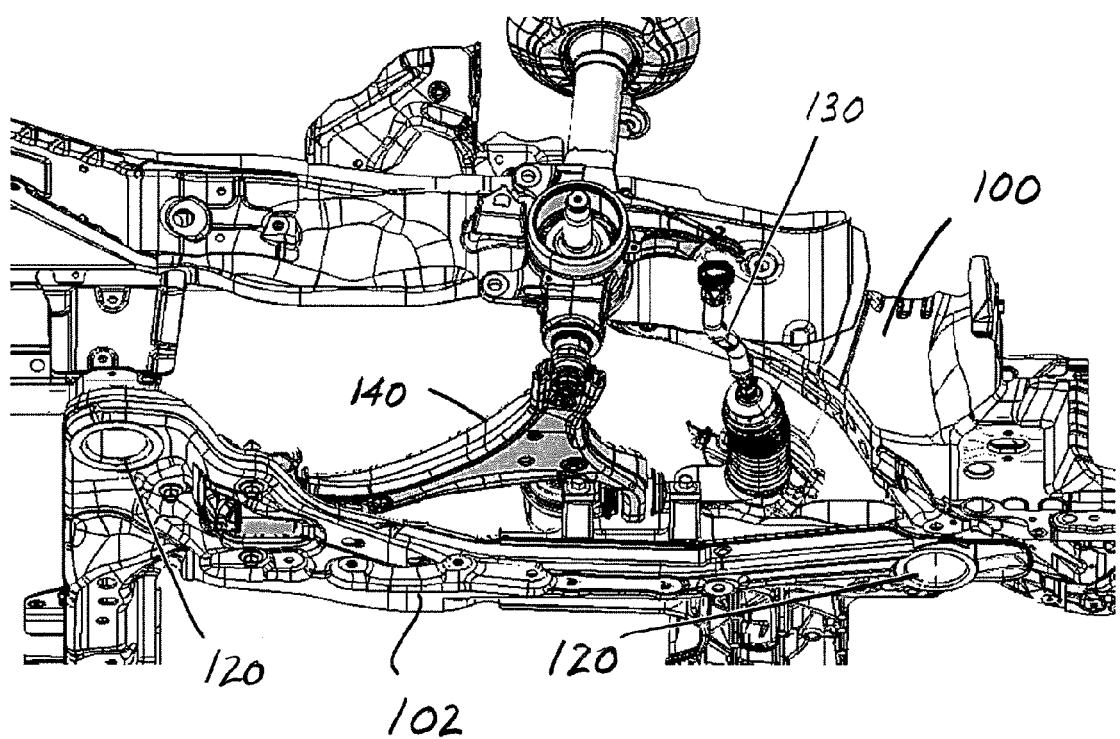
FIG. 1 is a view showing interconnection between the subframe and the frame/body in the region of the wheel.
Figure 2:
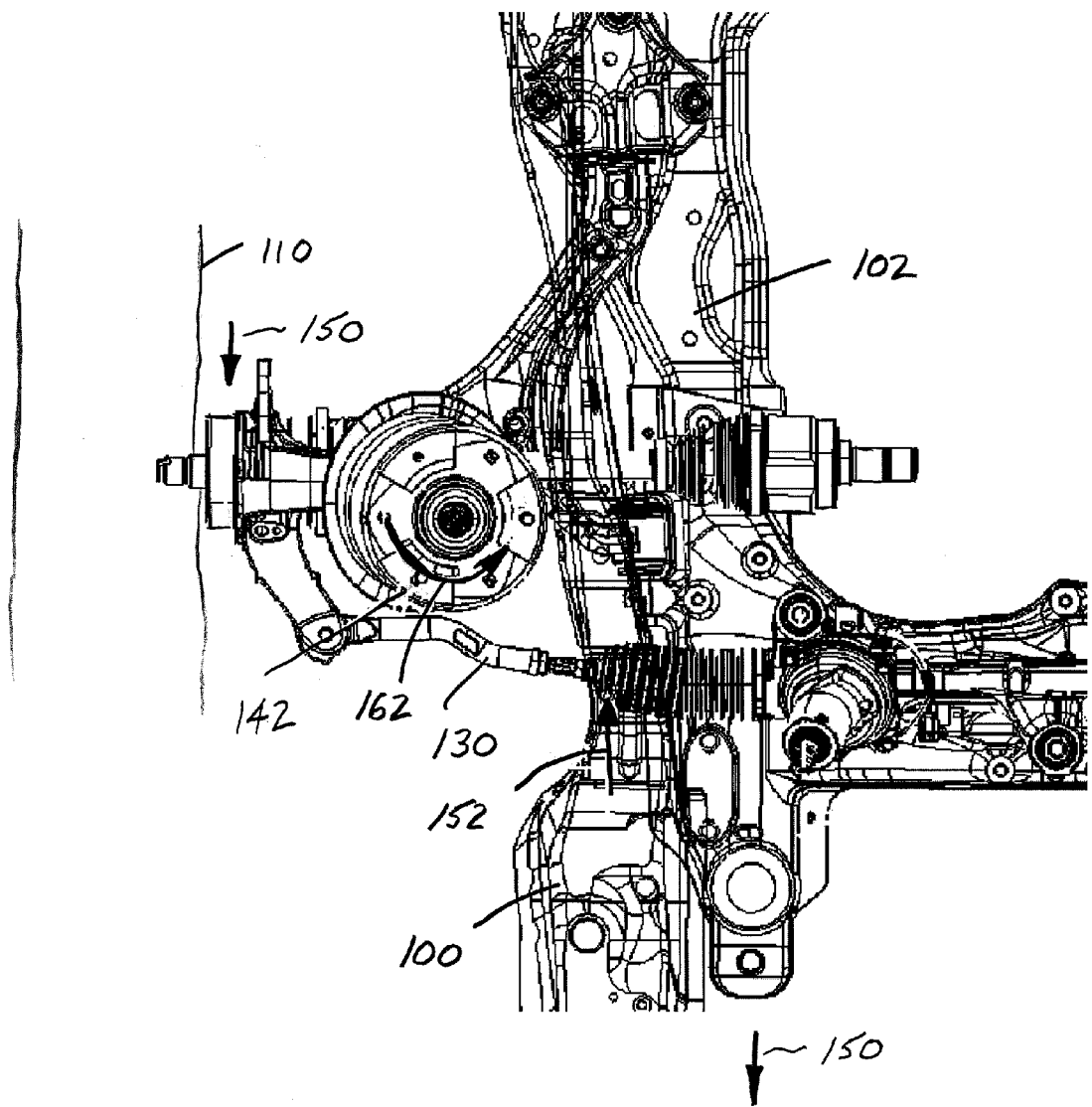
FIG. 2 is an overhead view thereof and generally illustrating rearward movement of the subframe relative to the frame during a crash event.
Figure 3:
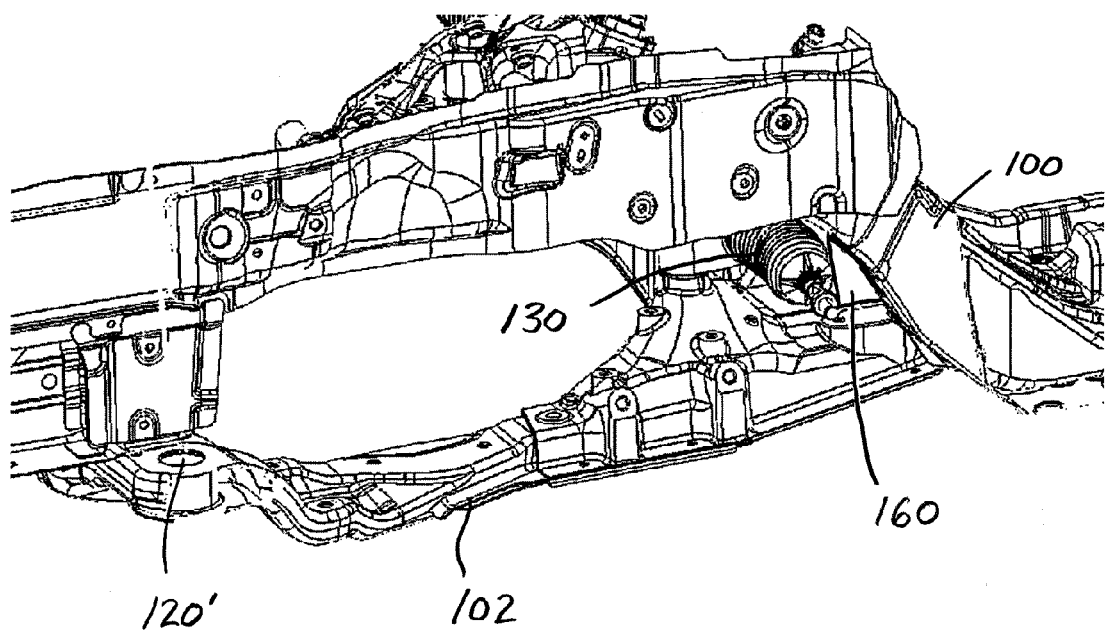
FIG. 3 is a perspective view of the subframe separated from the frame and a contact feature provided on the frame that engages the tie rod.
Figure 4:
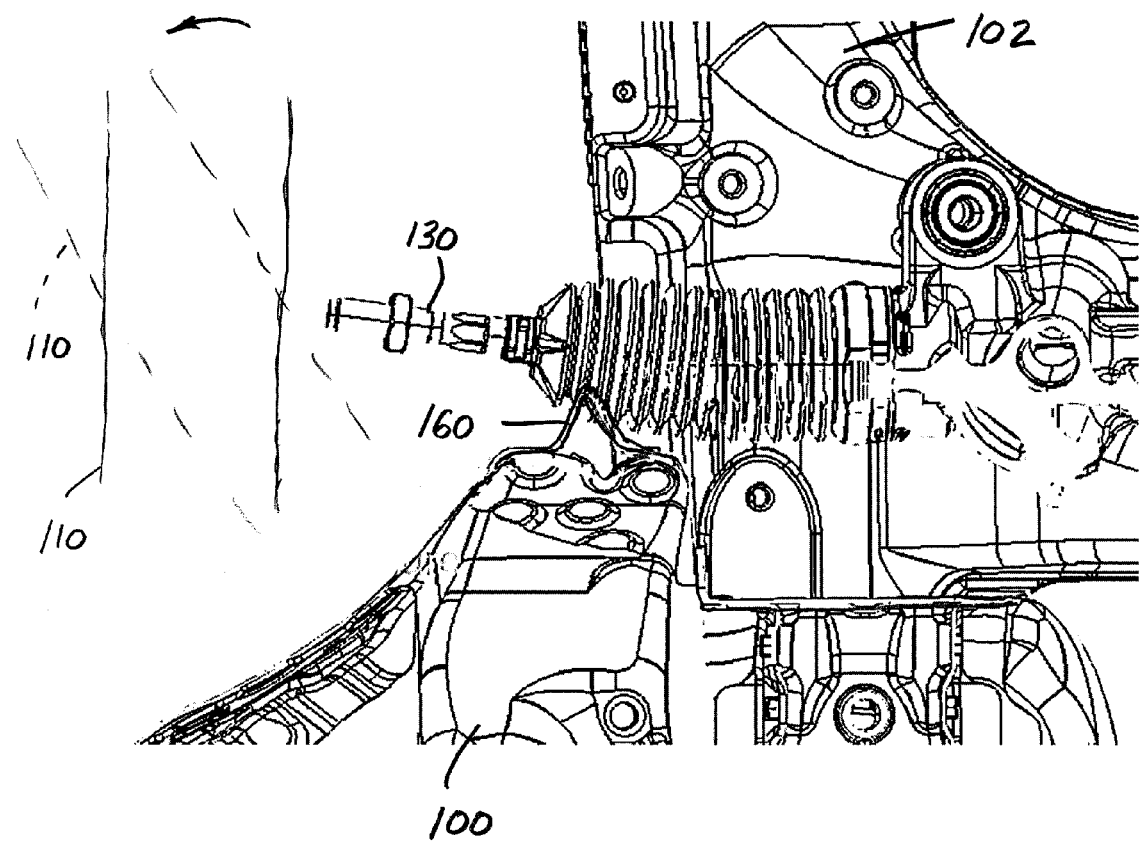
FIG. 4 is an enlarged overhead view of the arrangement shown in FIG. 3.

In a crash event, when a subframe detaches early in the crash event from a body, a wheel and suspension typically stay in a longitudinal axis. This results in a very stiff structure. For example, the wheel, brake rotor, brake caliper, knuckle, and/or wheel hub, use crush space that could otherwise advantageously be used for energy absorption. The energy absorption stroke of the body has increased importance and it is desirable that the subframe not interfere with maximizing the energy absorption stroke.

The steering rack and lower arm are typically attached to a subframe. Where the subframe detaches early in the crash event, the subframe and suspension components are moving rearward as a result of the force imposed by the barrier impact. Thus, a need exists for a modified structural arrangement that provides additional stroke space so that greater energy can be absorbed during the crash event.

Turning to FIGS. 1-4, there is shown a portion of a vehicle, namely, a portion of a vehicle body or frame 100 and a subframe 102. Although many of the detailed components are removed for ease of illustration of the subject disclosure, the subframe 102, for example, supports portions of a suspension assembly, steering assembly, and vehicle wheels (one wheel 110 schematically represented in FIGS. 2 and 4). As is known in the art, the subframe 102 is attached to frame 100 at spaced locations 120. The subframe 102 is attached (e.g. bolted and/or welded) to the frame 100 and designed to selectively detach from the frame. As shown here, subframe 102 carries at least a portion of the steering assembly (e.g., rack and pinion assembly, steering column, tie rod 130, etc.), braking assembly (brake rotor, brake caliper, etc.), and suspension assembly (e.g., support arm(s) 140, knuckle 142, shock absorber, coil spring, dampers, etc.). All or portions of these assemblies are either removed or not identified by a separate reference numeral if shown in the drawings for ease of illustration and understanding.

Thus, as shown in FIG. 1, subframe 102 is illustrated as being attached to frame 100 at various mounting points 120 and the subframe carries, among other components, tie rod 130. Extension and retraction movement of the tie rod 130 results in desired steering of wheel 110. In a crash event, for example if the vehicle is impacted in a front or an offset region (e.g., front of vehicle located at the top of the page in FIG. 2), forces are transmitted so that the subframe 102 detaches from the body 100 early in the crash event. The wheel and suspension stay in a longitudinal axis and are a very stiff structure (wheel, brake rotor, brake caliper, knuckle, and hub) that effectively use up valuable crush space. The subframe 102, (along with the attached components such as the steering rack, lower A arm 140, etc.) translates rearwardly as represented by reference numerals 150 in FIG. 2. Therefore, when the subframe 102 translates rearwardly, all of these components move as a system with the subframe. Likewise, the orientation of the wheels 110 is preserved until the wheels contact another component (represented by reference 152 in FIG. 2).

The present disclosure purposefully includes a structure referred to herein as a contact member 160 that deliberately causes the wheels 110 to rotate to a toe-out position. In one embodiment, the contact member is a protrusion that extends outwardly from the frame 100 and that advantageously increases stroke space with which to absorb energy in a crash event where the subframe 102 detaches from the frame. More particularly, the contact member assures a defined point of engagement with the tie rod that shortens the effective length of tie rod 130 as measured inwardly from the wheel 110 to an engagement location with either the frame 100 or subframe 102. The contact member 160 is shown as a part of or integrated into the frame 100 or as being mounted on the frame. In the process of the subframe 102 separating or detaching from the frame 100 (as indicated by reference numerals 150, 152 that are oriented in opposite directions), the contact member 160 imparts a bending load directly to the tie rod 130 and initiates bending of the tie rod as the subframe and frame move relative to one another after detachment of the subframe in a crash event (i.e., the frame and subframe move relative to one another generally along a vehicle front to vehicle rear orientation in response to a front or offset crash event). By including the contact member 160, for example, as a part of the frame 100 (a defined protruding surface of the frame) in the location illustrated in FIGS. 3 and 4, the contact member does not interfere with the normal range of operation or motion of the tie rod 130. Rather, the contact member 160 only contacts the tie rod 130 in the event of separation of subframe 102 from the frame 100 as represented by reference numeral 120' in FIG. 3. One skilled in the art will appreciate that contact member 160 may adopt a different configuration, different mounting location, or be formed as a portion of another component, such as being integrated into the conformation of another component in much the same manner as the being integrated in frame 100 in the illustrated embodiment. However, the contact member 160 is designed to impart movement of the wheel 110 to an orientation that maximizes or increases stroke space with which to absorb energy in a crash event, and in this preferred embodiment, the bending load is imposed directly on the tie rod 130 via engagement with the contact member. This shortens the effective length of tie rod 130 and causes knuckle 142 to rotate as represented by reference arrow 162 (FIG. 2) which turns the wheel 110 toward a toe out position so that the wheel takes up less crush space when compared to a straight on or toe in position. Imparting the bending load at a location laterally inward of knuckle 142 (FIG. 2) assures that the wheel 110 rotates to the toe out position upon a crash event.

As will be appreciated, the wheel 110 can move inwardly (toe in) or outwardly (toe out) relative to a straight ahead orientation. Here, the wheel is advantageously moved outwardly (toe out) as a result of the contact member 160 engaging the tie rod 130 when the subframe becomes disengaged. The frame 100 defines a plane disposed laterally inward from the plane of the wheel and extending from the front of the vehicle toward the rear of the vehicle. If the impact of a crash event is received at the front of the vehicle, for example, then it is desirable to rotate the wheel 110 toe outwardly as shown and described, i.e., the portion of the wheel disposed in front of the rotational axis of the wheel will be moved further away from the plane of the frame 100 and the portion of the wheel disposed behind the rotational axis of the wheel will be moved closer to the plane of the frame. As a result of the toe out rotation, that portion of the vehicle that is crushed by the impact has additional length in the front to rear direction of the vehicle to advantageously absorb the impact forces because the front portion of the wheel disposed forwardly of the rotational axis of the wheel has been moved further away from the plane of the frame 100. As will be appreciated, if the front portion of the wheel disposed forwardly of the rotational axis of the wheel was moved toward the plane of the frame 100, the length in the front to rear direction of the vehicle available for absorbing the impact forces would be reduced as a result of the wheel turning inwardly (toe in). Such a configuration would defeat the purpose of the present disclosure which desirably adds more stroke space with which to absorb energy in a crash event by advantageously rotating the wheel to a toe orientation.

By incorporating the bend initiating structure or contact member 160 as a reinforced region of the frame, the unique tie rod bending structure turns the wheel 110, the typical, incompressible dimension of the wheel is reduced, and there is more stroke space with which to absorb energy in a crash event. Detachment of the subframe 102 from the frame 100 during a crash event reduces the energy absorption capacity of the vehicle system because the subframe is no longer carrying load. Therefore, energy absorption stroke of the frame 100 has increased importance.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:
1. A vehicle body structure comprising:
a frame;
a subframe that selectively detaches from the frame in a crash event;
a tie rod extending from the subframe; and
a contact member that is mounted for contact with the tie rod when the subframe detaches from the frame, the contact member mounted to turn an associated wheel to a toe out position upon engagement with the tie rod that increases stroke space with which to absorb energy in a crash event where the subframe detaches.

2. The vehicle body structure of claim 1 wherein the contact member is dimensioned such that the contact member can engage the tie rod only when the subframe detaches from the frame.

3. The vehicle body structure of claim 1 wherein the contact member is located on the frame at a position that shortens an effective length of the tie rod upon engagement therewith.

4. The vehicle body structure of claim 1 wherein the contact member is mounted to the frame.

5. The vehicle body structure of claim 1 wherein the contact member is an integral part of the frame.

6. The vehicle body structure of claim 1 wherein the contact member is positioned laterally inward of a suspension knuckle to urge the knuckle and wheel to rotate the wheel to the toe out position.

7. The vehicle body structure of claim 1 wherein the frame and subframe are arranged for selective movement relative to one another when a crash event separates the subframe from the frame.

8. The vehicle body structure of claim 7 wherein the relative movement between the frame and subframe is substantially along a vehicle front to vehicle rear orientation.

9. A vehicle body structure comprising:
a frame;
a subframe secured to the frame and that selectively detaches from the frame in a crash event for movement relative thereto;
a tie rod extending from the subframe and joined to a wheel at a distal end; and
a contact member operatively associated with the frame for contact with the tie rod when the subframe detaches from the frame, the contact member mounted to engage the tie rod and initiate bending thereof and thereby turn an associated wheel to a toe out position that increases stroke space of the frame with which to absorb energy in the crash event.

10. The vehicle body structure of claim 9 wherein the contact member is dimensioned such that the contact member can engage the tie rod only when the subframe detaches from the frame.

11. The vehicle body structure of claim 9 wherein the contact member is located on the frame at a position that shortens an effective length of the tie rod upon engagement therewith.

12. The vehicle body structure of claim 9 wherein the contact member is mounted to the frame.

13. The vehicle body structure of claim 9 wherein the contact member is an integral part of the frame.

14. The vehicle body structure of claim 9 wherein the contact member is positioned laterally inward of a suspension knuckle to urge the knuckle and wheel to rotate the wheel to the toe out position.

15. The vehicle body structure of claim 9 wherein the frame and subframe are arranged for selective movement relative to one another when a crash event separates the subframe from the frame.

16. The vehicle body structure of claim 15 wherein the relative movement between the frame and subframe is substantially along a vehicle front to vehicle rear orientation.

17. A method of increasing stroke space with which to absorb energy in a crash event of a vehicle, the method comprising:

providing a frame and a subframe that selectively detaches from the frame in a crash event;

mounting a tie rod and associated wheel on the subframe; and contacting the tie rod when the subframe detaches from the frame to initiate bending thereof and thereby turn the associated wheel to a toe out position that increases stroke space of the frame with which to absorb energy in the crash event.

18. The method of claim 17 further comprising contacting the tie rod only when the subframe detaches from the frame.

19. The method of claim 17 further comprising providing a contact member operatively associated with the frame for contact with the tie rod.

20. The method of claim 19 wherein the contact member providing step includes forming a protrusion on the frame for engaging the tie rod in a front or offset crash event of the vehicle.

* * * * *